(12) United States Patent
Jiang et al.

(10) Patent No.: US 9,977,951 B2
(45) Date of Patent: May 22, 2018

(54) PICTURE RANKING METHOD, AND TERMINAL

(71) Applicant: Huawei Technologies Co., Ltd., Shenzhen (CN)

(72) Inventors: Zhuolin Jiang, Shenzhen (CN); Qiang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/255,468

(22) Filed: Sep. 2, 2016

(65) Prior Publication Data

US 2016/0371541 A1    Dec. 22, 2016

Related U.S. Application Data

(63) Continuation of application No. PCT/CN2014/089469, filed on Oct. 24, 2014.

(30) Foreign Application Priority Data

Mar. 12, 2014  (CN) .......................... 2014 1 0090640

(51) Int. Cl.
```
G06K 9/00      (2006.01)
G06F 17/30     (2006.01)
G06K 9/66      (2006.01)
G06N 99/00     (2010.01)
```
(52) U.S. Cl.
CPC ... *G06K 9/00288* (2013.01); *G06F 17/30247* (2013.01); *G06K 9/00268* (2013.01); *G06K 9/00677* (2013.01); *G06K 9/66* (2013.01); *G06N 99/005* (2013.01)

(58) Field of Classification Search
USPC .................................................. 382/115–118
See application file for complete search history.

(56) References Cited

U.S. PATENT DOCUMENTS

| 9,384,241 B2* | 7/2016 | Wang ................. G06F 17/30247 |
| 2004/0022442 A1* | 2/2004 | Kim ................... G06K 9/00241 |
| | | 382/225 |

(Continued)

FOREIGN PATENT DOCUMENTS

| CN | 102033958 A | 4/2011 |
| CN | 102982165 A | 3/2013 |

(Continued)

OTHER PUBLICATIONS

Machine Translation and Abstract of Chinese Publication No. CN103034714, Sep. 21, 2016, 23 pages.

(Continued)

*Primary Examiner* — Alex Liew
(74) *Attorney, Agent, or Firm* — Conley Rose, P.C.

(57) ABSTRACT

Embodiments of the present disclosure disclose a picture ranking method and a terminal. The picture ranking method comprises acquiring pictures stored in a terminal, detecting whether the pictures are first-type pictures, where the first-type picture refers to a picture including a human face, and when the pictures are first-type pictures, ranking the pictures according to a social relation model, or when the pictures are not first-type pictures, ranking the pictures according to a preset rule.

20 Claims, 4 Drawing Sheets

(56) References Cited

U.S. PATENT DOCUMENTS

| | | | | |
|---|---|---|---|---|
| 2011/0211736 | A1* | 9/2011 | Krupka | G06F 17/30259 |
| | | | | 382/118 |
| 2012/0233159 | A1* | 9/2012 | Datta | G06F 17/30256 |
| | | | | 707/728 |
| 2013/0011083 | A1* | 1/2013 | Berkovich | G06F 17/30244 |
| | | | | 382/305 |
| 2014/0006385 | A1 | 1/2014 | Ebers et al. | |
| 2015/0213305 | A1* | 7/2015 | Sundstrom | G06K 9/00281 |
| | | | | 382/118 |

FOREIGN PATENT DOCUMENTS

| | | | |
|---|---|---|---|
| CN | 103034714 | A | 4/2013 |
| CN | 103139386 | A | 6/2013 |
| CN | 103312730 | A | 9/2013 |
| CN | 103377233 | A | 10/2013 |
| WO | 2008048769 | A1 | 4/2008 |

OTHER PUBLICATIONS

Felzenszwalb, P., et al., "Object Detection with Discriminatively Trained Part Based Models," IEEE Transactions on Pattern Analysis and Machine Intelligence, vol. 32, No. 9, Sep. 22, 2009, 20 pages.

Foreign Communication From a Counterpart Application, PCT Application No. PCT/CN2014/089469, English Translation of International Search Report dated Jan. 21, 2015, 2 pages.

Foreign Communication From a Counterpart Application, PCT Application No. PCT/CN2014/089469, English Translation of Written Opinion dated Jan. 21, 2015, 7 pages.

Machine Translation and Abstract of Chinese Publication No. CN102982165, Mar. 20, 2013, 27 pages.

Machine Translation and Abstract of Chinese Publication No. CN103377233, Oct. 30, 2013, 11 pages.

Foreign Communication From a Counterpart Application, Chinese Application No. 201410090640.6, Chinese Office Action dated Sep. 25, 2017, 6 pages.

* cited by examiner

PICTURE RANKING METHOD, AND TERMINAL

CROSS-REFERENCE TO RELATED APPLICATIONS

This application is a continuation of International Application No. PCT/CN2014/089469, filed on Oct. 24, 2014, which claims priority to Chinese Patent Application No. 201410090640.6, filed on Mar. 12, 2014, both of which are hereby incorporated by reference in their entireties.

TECHNICAL FIELD

The present disclosure relates to the field of picture ranking, and in particular, to a picture ranking method and a terminal.

BACKGROUND

With rapid development of computer technologies and photography technologies, a conventional terminal such as a smartphone or a tablet computer generally has a photographing device, can photograph a picture using the photographing device, and certainly, may also acquire a picture through the Internet to help a user view the picture using the terminal.

However, the conventional terminal generally performs grouping in a manner in which a user creates a directory, or automatically divides groups using simple information such as time points and places. Most pictures photographed using the photographing device are also arranged according to photographing time points, or are arranged according to global positioning system (GPS) place information of photographs in a mobile phone. In this way, a problem that picture grouping and ranking manners are monotonous is caused.

SUMMARY

Embodiments of this application provide a picture ranking method and a terminal, which can make picture grouping and ranking manners richer and more diversified.

According to a first aspect of the present disclosure, a picture ranking method is provided, where the method includes acquiring pictures stored in a terminal, detecting whether the pictures are first-type pictures, where the first-type picture refers to a picture including a human face, and when the pictures are first-type pictures, ranking the pictures according to a social relation model, or when the pictures are not first-type pictures, ranking the pictures according to a preset rule.

With reference to the first aspect, in a first possible implementation manner, before the ranking the pictures according to a social relation model, the method further includes training the social relation model using a stored profile picture of a contact and information about the contact.

With reference to the first possible implementation manner of the first aspect, in a second possible implementation manner of the first aspect, the training the social relation model using a stored profile picture of a contact and information about the contact includes extracting profile picture data of the contact, and annotating the profile picture data using the information about the contact to obtain the social relation model.

With reference to the first aspect or either of the first and second possible implementation manners, in a third possible implementation manner of the first aspect, the ranking the pictures according to a social relation model includes acquiring, using the social relation model, information about contacts corresponding to the pictures, where the information about the contacts corresponding to the pictures includes identity features of the contacts, and when the information about the contacts corresponding to the pictures is successfully acquired, adding the pictures to a recognized face group, and ranking pictures in the recognized face group according to the identity features, or when the information about the contacts corresponding to the pictures is not acquired, adding the pictures to an unrecognized face group, and performing clustering ranking on images in the unrecognized face group according to the preset rule.

With reference to the first aspect or any one of the first to third possible implementation manners, in a fourth possible implementation manner of the first aspect, before the detecting whether the pictures are first-type pictures, the method further includes extracting a feature value of a stored human face image, and learning the feature value of the human face image using a machine learning method, and establishing a facial recognition model.

With reference to the fourth possible implementation manner of the first aspect, in a fifth possible implementation manner of the first aspect, the detecting whether the pictures are first-type pictures includes extracting feature values of the pictures, performing matching between the feature values of the pictures and the facial recognition model, and when a result of the matching is higher than a first preset value, determining that the pictures are the first-type pictures, or when a result of the matching is not higher than a first preset value, determining that the pictures are not the first-type pictures.

According to a second aspect of the present disclosure, a terminal is provided, where the terminal includes a picture acquiring unit configured to acquire pictures stored in the terminal, a detection unit configured to receive the picture sent by the picture acquiring unit, and detect whether the pictures are first-type pictures, where the first-type picture refers to a picture including a human face, a first ranking unit configured to, when the detection unit detects that the pictures are first-type pictures, rank the pictures according to a social relation model, and a second ranking unit configured to, when the detection unit detects that the pictures are not first-type pictures, rank the pictures according to a preset rule.

With reference to the second aspect, in a first possible implementation manner, the terminal further includes a social model training unit, where the social model training unit is configured to train the social relation model using a stored profile picture of a contact and information about the contact, and the first ranking unit is configured to, when the detection unit detects that the pictures are first-type pictures, rank the pictures according to the social relation model trained by the social model training unit.

With reference to the first possible implementation manner of the second aspect, in a second possible implementation manner of the second aspect, the social model training unit is configured to extract profile picture data of the contact, and annotate the profile picture data using the information about the contact to obtain the social relation model.

With reference to the second aspect or either of the first and second possible implementation manners, in a third possible implementation manner of the second aspect, the first ranking unit is configured to acquire, using the social relation model, information about contacts corresponding to the pictures, where the information about the contacts corresponding to the pictures includes identity features of the contacts, and when the information about the contacts corresponding to the pictures is successfully acquired, add the pictures to a recognized face group, and rank pictures in the recognized face group according to the identity features, or when the information about the contacts corresponding to the pictures is not acquired, add the pictures to an unrecognized face group, and perform clustering ranking on images in the unrecognized face group according to the preset rule.

With reference to the second aspect or any one of the first to third possible implementation manners, in a fourth possible implementation manner of the second aspect, the terminal further includes a facial model establishment unit, where the facial model establishment unit is configured to extract a feature value of a stored human face image, and learn the feature value of the human face image using a machine learning method, and establish a facial recognition model, and the detection unit is configured to detect whether the pictures are first-type pictures according to the facial recognition model established by the facial model establishment unit.

With reference to the fourth possible implementation manner of the second aspect, in a fifth possible implementation manner of the second aspect, the detection unit is configured to extract feature values of the pictures, perform matching between the feature values of the pictures and the facial recognition model, and when a result of the matching is higher than a first preset value, determine that the pictures are the first-type pictures, or when a result of the matching is not higher than a first preset value, determine that the pictures are not the first-type pictures.

In the embodiments of the present disclosure, in technical solutions of this application, it is detected whether acquired pictures are first-type pictures, and when the pictures are first-type pictures, the pictures are ranked according to a social relation model, or when the pictures are not first-type pictures, the pictures are ranked according to a preset rule. In this way, the pictures may be ranked in different manners according to different types of the pictures, thereby resolving a technical problem in the prior art that ranking of pictures is monotonous, and achieving a technical effect of diversified ranking of pictures.

DESCRIPTION OF EMBODIMENTS

For a technical problem in the prior art of monotonous grouping and ranking when pictures are grouped and ranked, the technical solutions provided herein in the embodiments of the present disclosure include detecting whether acquired pictures are first-type pictures, and when the pictures are first-type pictures, the pictures are ranked according to a social relation model, or when the pictures are not first-type pictures, the pictures are ranked according to a preset rule. In this way, the pictures may be ranked in different manners according to different types of the pictures, thereby resolving a technical problem in the prior art that ranking of pictures is monotonous, and achieving a technical effect of diversified ranking of pictures.

Main implementation principles and specific implementation manners of the technical solutions in the embodiments of the present disclosure, and corresponding beneficial effects that the technical solutions in the embodiments of the present disclosure can achieve are described in detail below with reference to the accompanying drawings.

Figure 1:
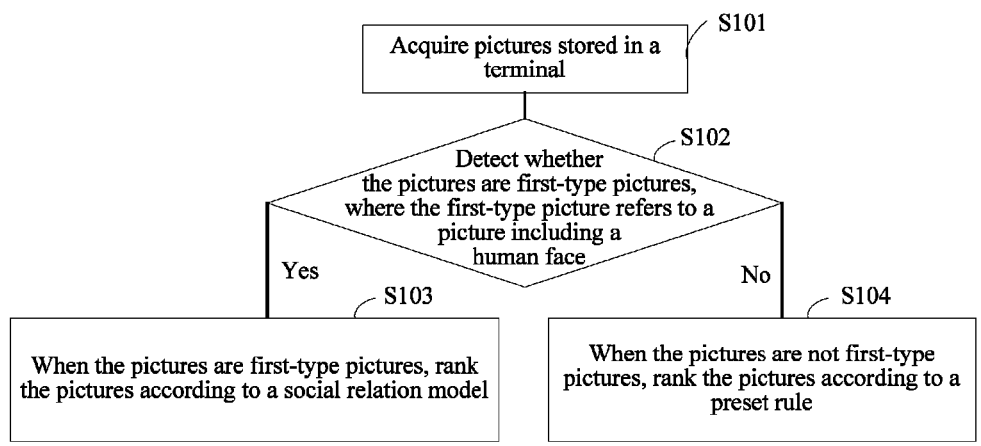
FIG. 1 is a method flowchart of a picture ranking method according to an embodiment of the present disclosure.

An embodiment of the present disclosure provides a picture ranking method. As shown in FIG. 1, a specific processing process of the method is as follows.

Step S101: Acquire pictures stored in a terminal.

Step S102: Detect whether the pictures are first-type pictures, where the first-type picture refers to a picture including a human face.

Step S103: When the pictures are first-type pictures, rank the pictures according to a social relation model.

Step S104: When the pictures are not first-type pictures, rank the pictures according to a preset rule.

In step S101, pictures stored in a terminal are acquired.

In a specific implementation process, the terminal in this embodiment of this application is, for example, a mobile phone, a tablet computer, or another terminal. The pictures may be captured using a camera disposed in the terminal or an external camera, and then stored in the terminal, or may be downloaded from a local database or an external database and stored in the terminal. Then, the pictures stored in the terminal are acquired.

A smartphone is used as an example. When a smartphone A is used to capture a picture of a user B, a picture of the user B is captured using a camera in the smartphone A, and the picture of the user B is stored in a storage of the smartphone A. Then the picture of the user B stored in the smartphone A is acquired. A picture of a scene C may further be captured using the camera and stored. The scene C is, for example, an environment including running water or a waterfall or a flower or a mountain. Then the picture of the scene C stored in the smartphone A is acquired.

Next, step S102 is performed. In this step, it is detected whether the pictures are first-type pictures, where the first-type picture refers to a picture including a human face.

In a specific implementation process, after the pictures are acquired, it is detected whether the pictures are the first-type pictures, and the pictures are ranked in different manners according to a detection result.

In one embodiment, after the pictures are acquired, it may be detected, using a human face detection method, whether the pictures are the first-type pictures. When it is detected that the pictures include human face pictures, it is determined that the pictures are the first-type pictures, or when it is detected that the pictures include no human face picture, it is determined that the pictures are not the first-type pictures.

In one embodiment, the human face detection method may be, for example, a latent support vector machine (SVM) based method, a target detection method based on a discriminative learning partial model, or another method. It can be more accurately detected, using the human face detection method, whether the pictures are the first-type pictures. When it is detected that the pictures are the first-type pictures, step S103 is performed, or when it is detected that the pictures are not the first-type pictures, step S104 is performed.

A smartphone is used as an example. When a picture D is captured using a camera in a smartphone A and stored, the picture D is acquired, and it is detected, using the latent SVM based detection method, whether the picture D includes a human face picture. If the picture D includes a human face picture, it may be determined that the picture D belongs to the first-type picture, or if the picture D includes no human face picture, it may be determined that the picture D is not the first-type picture.

In a specific implementation process, after the pictures are acquired, it may be detected, using a facial recognition model, whether the pictures are the first-type pictures. When it is detected that the pictures include human face pictures, it is determined that the pictures are the first-type pictures, or when it is detected that the pictures include no human face picture, it is determined that the pictures are not the first-type pictures.

In one embodiment, before the detecting whether the pictures are first-type pictures, the method further includes extracting a feature value of a stored human face image, and learning the feature value of the human face image using a machine learning method, and establishing a facial recognition model, to detect, using the facial recognition model, whether the pictures are the first-type pictures.

In one embodiment, when the feature value of the stored human face image is to be extracted, feature values of the pictures may be extracted using a principal component analysis (PCA) method, a sparse coding method, or the like. Then, the facial recognition model is established and updated using the machine learning method, where the facial recognition model may be learned or trained by means of a Bayesian model, an SVM, logistic regression, or using another method. A new type of facial recognition model may be learned or trained by means of transfer learning such as covariance shift and transfer ADABOOST, and based on multi-task learning, or another method, so that during a learning process of the machine learning method, as time/data increases, intelligence of the terminal also increases, and as human face targets and/or types increase, the intelligence of the terminal also increases.

When the feature value of the stored human face image is to be extracted, extraction may be performed using a knowledge-based representation method and an algebraic feature based representation method or a statistical learning based representation method. The knowledge-based representation method mainly obtains, according to shape descriptions of organs of human faces and features of distances between the organs, feature data facilitating classification of human faces, and a feature component of the feature data generally includes a Euclidean distance, curvature, an angle, or the like between feature points. The human face mainly includes parts such as eyes, a nose, a mouth, and a chin, and the knowledge-based human face representation mainly acquires geometric features of these parts and of structural relations between these parts. Then, the facial recognition model is established and updated using the machine learning method.

In one embodiment, when it is detected, using the facial recognition model, whether the pictures are the first-type pictures, the detecting whether the pictures are first-type pictures includes extracting feature values of the pictures, performing matching between the feature values of the pictures and the facial recognition model, and when a result of the matching is higher than a first preset value, determining that the pictures are the first-type pictures, or when a result of the matching is not higher than a first preset value, determining that the pictures are not the first-type pictures.

In one embodiment, when the feature values of the pictures are to be extracted, the feature values of the pictures may be extracted using the PCA method, sparse coding, or the like. Matching is performed between the feature values of the pictures and the facial recognition model, and if the result of the matching is higher than the first preset value, it is determined that the pictures are the first-type pictures, or if the result of the matching is not higher than the first preset value, it is determined that the pictures are not the first-type pictures.

The first preset value is, for example, a value greater than or equal to 50 percent (%), and may be, for example, 50%, 60%, 70%, or another value. After the feature values of the pictures are extracted, matching is performed between the feature values of the pictures and the facial recognition model, and if the result of the matching is higher than the first preset value, it is determined that the pictures are the first-type pictures, or if the result of the matching is not higher than the first preset value, it is determined that the pictures are not the first-type pictures.

For example, a smartphone is used as an example. When establishing a facial recognition model, a smartphone A first extracts a feature value of a human face image stored in the smartphone A, and then learns the feature value of the human face image using the machine learning method to establish the facial recognition model. If a picture D is captured using a camera in the smartphone A, a feature value of the picture D is extracted using the PCA method, matching is performed between the feature value of the picture and the facial recognition model, and an obtained result of the matching is 60%. If the first preset value is 55%, because 60% is less than (>) 50%, the result of the matching is higher than the first preset value, and it is determined that the picture D is the first-type picture, or if the first preset value is 60%, because the result of the matching is also 60%, the result of the matching is not higher than the first preset value, and it is determined that the picture D is not the first-type picture.

When the pictures are first-type pictures, step S103 is performed, that is, rank the pictures according to a social relation model. In a specific implementation process, before the ranking the pictures according to a social relation model, the method further includes training the social relation model using a stored profile picture of a contact and information about the contact.

In one embodiment, when the social relation model is to be trained, for each contact, statistics about information, such as a quantity of contact times, a time point of contact, content of a short message service message of each contact, is collected, and a relation between the contact and a user operating the terminal is obtained in a training prediction manner. For example, for each contact, an identity of the contact is deduced according to examples or rules of calls or short message service messages that are within a particular time period, and as interaction gradually increases, the relation between the contact and the user is automatically determined. In this manner, dependency between the user and each contact may be obtained. For example, the contact is a friend, a relative, a customer, or the like. Then the social relation is established according to the dependency between the user and each contact, where the social relation is used to represent a structural expression manner of a social relation between the user and other contacts. The user and other contacts in the social relation are all represented using nodes, and a connection line between the user and each contact of other contacts is used to represent the dependency between the two, for example, a relation such as a friend, a relative, or a customer.

A smartphone is used as an example. A user operating a smartphone A is a user A1, and a contact list stored in the smartphone A includes a contact A2, a contact A3, and a contact A4. First communication information between the smartphone A and the contact A2 is acquired. If the first communication information represents that a quantity of times of contact between the user A1 and the contact A2 is 0.2 times on average every day, and time points of contact are distributed in time periods of 09:00 to 12:00 and 14:00 to 17:00, it may be deduced that the contact A2 is a customer of the user A1.

In addition to the first communication information, second communication information between the smartphone A and the contact A3 may further be acquired. If the second communication information represents that a quantity of times of contact between the user A1 and the contact A3 is 0.1 times on average every day, time points of contact are distributed in a time period of 18:00 to 22:00, and a quantity of short message service message information receive and transmit times is 0.5 times every 10 days, it may be deduced that the contact A3 is a relative of the user A1.

Further, in addition to the first communication information, third communication information between the smartphone A and the contact A4 may further be acquired. If the third communication information represents that a quantity of times of contact between the user A1 and the contact A4 is 0.3 times on average every day, time points of contact are distributed in a time period of 18:00 to 22:00, and a quantity of short message service message information receive and transmit times is twice every 10 days, it may be deduced that the contact A4 is a friend of the user A1. Then a social relation is established according to dependency between the user A1 and the contact A2, the contact A3, and the contact A4. A length of a connection line between the user and another contact may be determined according to closeness, where a closer relation between the user and a contact indicates a shorter length of a connection line between the user and the contact, and a more distant relation between the user and a contact indicates a longer length of a connection line between the user and the contact. For example, referring to FIG. 2, a length of a connection line 21 between the user A1 and the contact A3 is less than a length of a connection line 22 between the user A1 and the contact A4, and the length of the connection line 22 is less than a length of a connection line 20 between the user A1 and the contact A2.

In one embodiment, the training the social relation model using a stored profile picture of a contact and information about the contact includes extracting profile picture data of the contact, and annotating the profile picture data using the information about the contact to obtain the social relation model, so that when the pictures are recognized using the social relation model, contacts corresponding to the pictures can be quickly determined.

In one embodiment, after the social relation model is trained using the stored profile picture of the contact and the information about the contact, information about the contacts corresponding to the pictures is acquired using the social relation model, where the information about the contacts corresponding to the pictures includes identity features of the contacts, and when the information about the contacts corresponding to the pictures are successfully acquired, the pictures is added to a recognized face group, and pictures in the recognized face group are ranked according to the identity features, or when the information about the contacts corresponding to the pictures are not acquired, the pictures are added to an unrecognized face group, and clustering ranking is performed on images in the unrecognized face group according to the preset rule.

Because the social relation model is to extract the profile picture data of the contact, and annotate the profile picture data using the information about the contact to obtain the social relation model, in this way, the information about the contacts corresponding to the pictures may be acquired using the social relation model, where the information about the contacts corresponding to the pictures includes the identity features of the contacts, and the identity feature is a relation between the contact corresponding to the picture and the user operating the terminal. For example, the identity feature of the contact may be a relative, a friend, or a classmate of the user of the terminal.

In one embodiment, when the information about the contacts corresponding to the pictures is obtained using the social relation model, closeness between the contacts corresponding to the pictures and the user operating the terminal is determined according to the identity features of the contacts that are included in the information about the contacts. Then, ranking is performed according to the closeness between the contacts corresponding to the pictures and the user. When the information about the contacts corresponding to the pictures is not acquired, ranking is performed in a clustering grouping manner according to similarities of human face pictures.

When ranking is performed according to the closeness between the contacts and the user, a contact with a closer relation is ranked higher, and a contact with a more distant relation is ranked lower. After the identity features of the contacts corresponding to the pictures are acquired, profile picture data of the contacts corresponding to the pictures is extracted, the profile picture data is annotated using the information about the contacts to obtain the social relation model, the facial recognition model is trained using the pictures, and the social relation model is trained using the pictures.

Closer relations between the contacts corresponding to the pictures and the user indicate that the pictures are ranked higher, which helps the user view the pictures. Moreover, the contacts corresponding to the pictures are further used to mark the pictures, and the pictures corresponding to the contacts may be searched for in an index search manner for contacts, therefore, the pictures can be more accurately and more quickly searched for.

Figure 2:
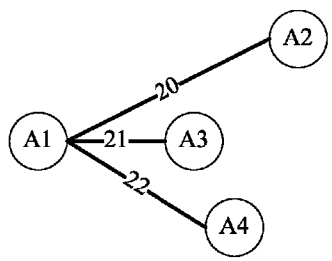
FIG. 2 is a structural diagram between a user and contacts according to the embodiment of the present disclosure.

For example, referring to FIG. 2, when a picture D is captured using a camera in a smartphone A and stored, the picture D is acquired, and when it is detected, using the facial recognition model, that the picture D belongs to the first-type picture, a contact, that is, A2, that corresponds to the picture D is acquired according to the social relation model. A relation between a user A1 operating the smartphone A and the contact is acquired, the picture D is added to the recognized face group, and then ranking is performed according to the relation between A2 and A1. Because a length of a connection line 20 is less than a length of a connection line 22 and a length of a connection line 21, the picture D is ranked lower than a picture of a contact A3 and a picture of a contact A4. Because the length of the connection line 21 is less than the length of the connection line 22, the picture of the contact A3 is ranked lower than the contact A4. After the contact, that is, A2, that corresponds to the picture D is acquired according to the social relation model, profile picture data in the picture D is extracted, the profile picture data in the picture D is annotated using information about the contact A2, the facial recognition model is trained using the picture D, and the social relation model is trained using the picture D.

Further, when a picture G is captured using the camera in the smartphone A and stored, the picture G is acquired, and when it is detected, using the facial recognition model, that the picture G belongs to the first-type picture, if no contact corresponding to the picture G is acquired according to the social relation model, the picture is added to the unrecognized face group, and clustering grouping is performed according to a similarity between the picture G and another picture in the unrecognized face group.

Figure 3:
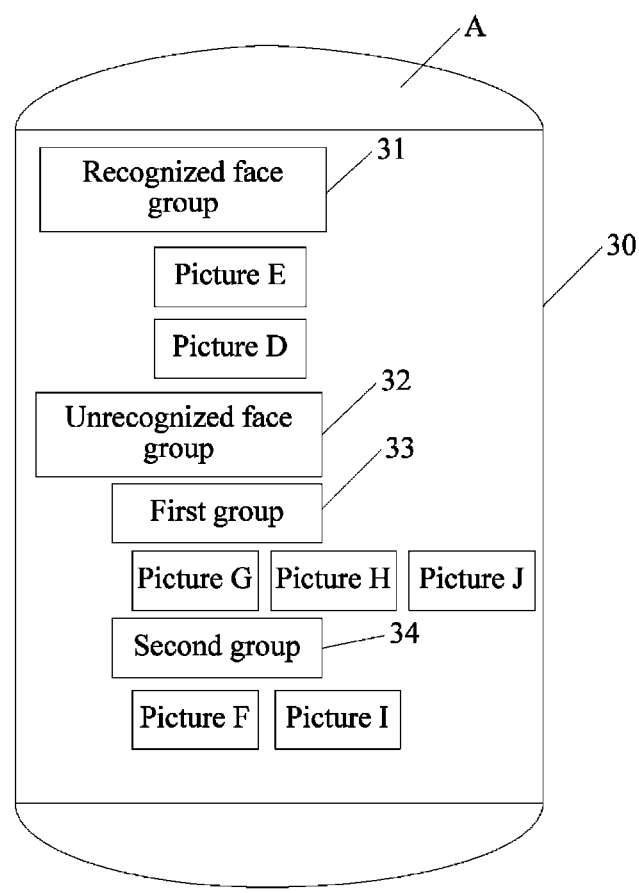
FIG. 3 is a first structural diagram showing that pictures are displayed in a terminal according to the embodiment of the present disclosure.

For another example, referring to FIG. 2 and FIG. 3, when the picture D and a picture E that are stored in the smartphone A are acquired, and when it is detected, using the facial recognition model, that the picture D belongs to the first-type picture, the contact, that is, the contact A2, that corresponds to the picture D is acquired according to the social relation model, and the contact, that is, the contact A3, that corresponds to the picture E is acquired. The picture D and the picture E are added to a recognized face group 31. Because the length of the connection line 21 is less than the length of the connection line 20, according to the principle that a closer relation between the user and a contact indicates a shorter length of a connection line between the user and the contact, and a more distant relation between the user and a contact indicates a longer length of a connection line between the user and the contact, it is determined that a relation between the user and the contact A3 is closer. Therefore, the picture E is ranked higher than the picture D in the recognized face group 31. For details, refer to an order of the picture E and the picture D that is on a touchscreen 30 of the smartphone A in FIG. 3.

In one embodiment, when the identity features are not acquired using the social relation model, features of human faces in the pictures may be extracted, and clustering grouping is performed according to similarities of the human faces. When only the pictures that are unrecognized exist, the pictures are used as a group, or when another unrecognized picture exists in the terminal, clustering grouping is performed according to the similarities of the human faces.

Referring to FIG. 3, when a picture F, a picture G, a picture H, a picture I, and a picture J that are stored in the smartphone A are acquired, and when it is detected, using the facial recognition model, that the picture F, the picture G, the picture H, the picture I, and the picture J belong to the first-type pictures, if contacts corresponding to the picture F, the picture G, the picture H, the picture I, and the picture J are not acquired according to the social relation model, the picture F, the picture G, the picture H, the picture I, and the picture J are added to an unrecognized face group 32.

If similarities of human faces in each two pictures of the picture G, the picture H, and the picture J are all greater than the preset threshold, the picture G, the picture F, and the picture J are classified into a first group 33. If a similarity of human faces in the picture F and the picture I is greater than the preset threshold, the picture F and the picture I are classified into a second group 34. When ranking is to be performed for each group, ranking may be performed according to a quantity of pictures included in each group. For example, a group including more pictures may be ranked higher than a group including fewer pictures. In this way, the first group 33 is ranked higher, and the second group 34 is ranked lower.

The group including more pictures may be ranked lower than the group including fewer pictures, which is not limited in this application.

When the pictures are not first-type pictures, step S104 is performed, that is, rank the pictures according to a preset rule. The preset rule may be ranking the pictures according to time points or according to places or in another manner.

In a specific implementation process, when it is detected in step S102 that the pictures are not the first-type pictures, it represents that the pictures are second-type pictures, and the pictures may be ranked in a time point or place manner.

In one embodiment, when the pictures are not the first-type pictures, time points at which the pictures are acquired are recorded, and the pictures are ranked according to the recorded time points at which the pictures are acquired.

For example, a smartphone A acquires a scenery picture B1 on Mar. 15, 2012, and acquires a scenery picture B2 on May 16, 2012. Because May 16, 2012 is after Mar. 15, 2012, in this way, the scenery picture B2 is ranked higher than the scenery picture B1.

In one embodiment, when the pictures are not the first-type pictures, places at which the pictures are acquired are recorded, and the pictures are ranked according to the recorded places at which the pictures are acquired.

For example, a place at which the smartphone A is located is Chengdu city. If a place at which the scenery picture B1 is acquired is located in Chengdu city, and a place at which the scenery picture B2 is acquired is located in Xichang city, because the place at which the scenery picture B1 is acquired and the place at which the smartphone A is located are in a same city, but the place at which the scenery picture B2 is acquired and the place at which the smartphone A is located are in different cities, scenery pictures are ranked according to distances from places at which the scenery pictures are acquired to the place at which the smartphone A is located, and a closer distance indicates a higher ranking. In this way, the scenery picture B2 is ranked higher than the scenery picture B1.

Because the pictures may be the first-type pictures, or may be the second-type pictures, pictures stored in the terminal may be classified into two types, where a first type is the first-type pictures, and a second type is pictures that are not the first-type pictures. Further, in the first-type pictures, all pictures for which the identity features of the contacts of the pictures are acquired may further be classified as the recognized face group, and all pictures for which the identity features of the contacts of the pictures are not acquired are classified as the unrecognized face group, so that when a picture is searched for, searching may be performed according to a group or type to which the picture belongs, and a quantity of pictures that are searched becomes smaller, thereby improving work efficiency of picture searching. Moreover, when the recognized face group is searched for a picture, because all pictures in the recognized face group are annotated using information about contacts corresponding to the pictures, in this way, the picture may be searched for in a contact information index search manner, which further improves the work efficiency of the picture searching.

Figure 4:
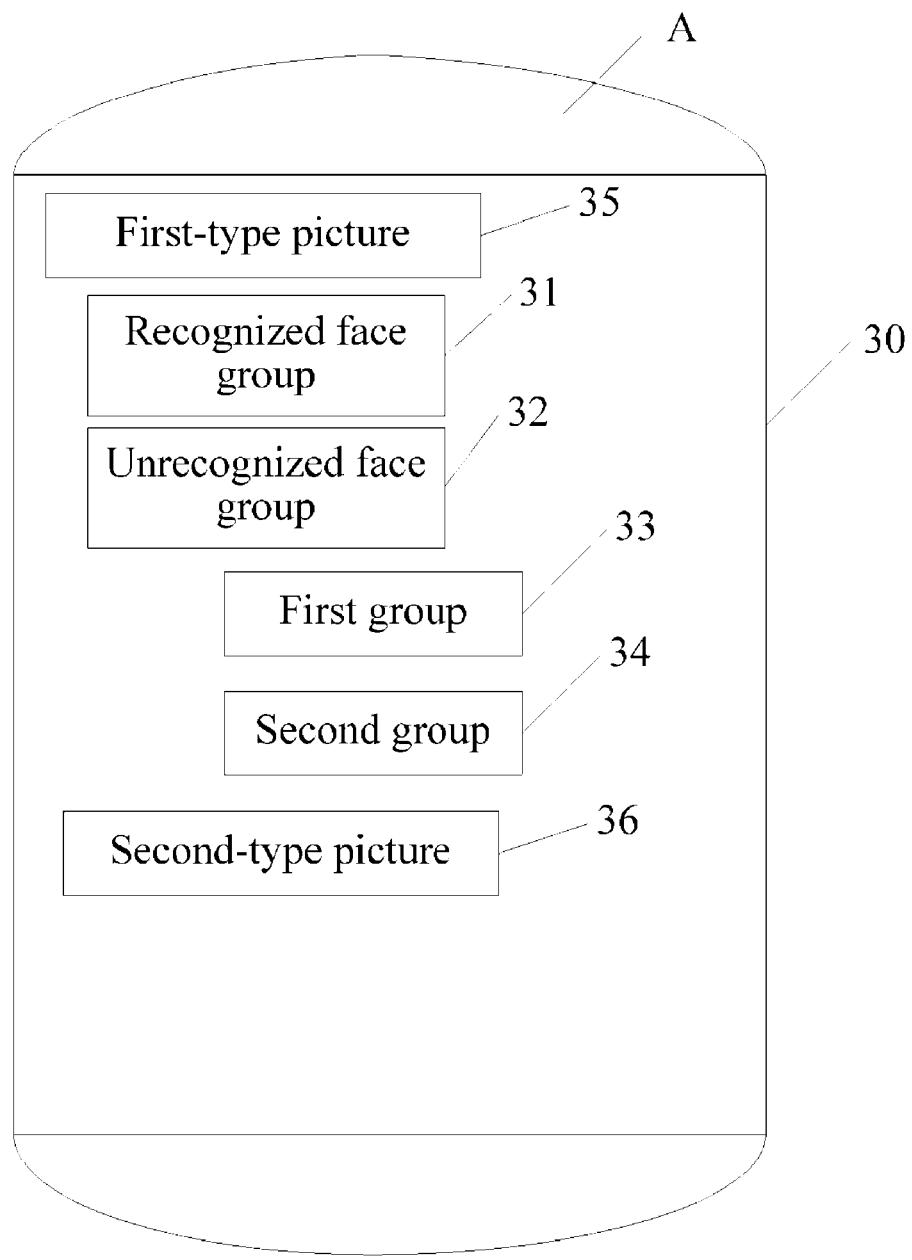
FIG. 4 is a second structural diagram showing that pictures are displayed in a terminal according to the embodiment of the present disclosure.

In one embodiment, after the pictures are ranked, the ranked pictures further need to be displayed, to help the user view the pictures. In one embodiment, as shown in FIG. 4, a first-type picture 35 and a second-type picture 36 are displayed on a display screen 30 of a smartphone A, where the first-type picture 35 is further classified into two types: a recognized face group 31 and an unrecognized face group 32, and the unrecognized face group 32 is further classified into a first group 33 and a second group 34. When the recognized face group 31 is double-clicked, pictures included in the recognized face group 31 are displayed, and when the unrecognized face group 32 is clicked, the first group 33 and the second group 34 of the unrecognized face group 32 are hidden, and the unrecognized face group 32 is displayed.

In another embodiment, the facial recognition model may further update an old model according to newly learned knowledge, so that each model is continuously updated and optimized. For example, for establishment and updating of a human face classification model, all types are harmonized, facial recognition of each contact is used as an independent task, and a global learning model and a customized task configuration are introduced to different tasks. Therefore, for a human face that is not seen before, the new human face may be expressed by invoking a global feature that is learned from features of seen human faces, so that expression of the new human face is discriminative, and as samples gradually increase, the facial recognition model is continuously updated, performance of discriminating the human face becomes better, and the pictures can be recognized more accurately using the recognition model.

In this embodiment of the present disclosure, in the technical solution of this application, it is detected whether acquired pictures are first-type pictures, and when the pictures are first-type pictures, the pictures are ranked according to a social relation model, or when the pictures are not first-type pictures, the pictures are ranked according to a preset rule. In this way, the pictures may be ranked in different manners according to different types of the pictures, thereby resolving a technical problem in the prior art that ranking of pictures is monotonous, and achieving a technical effect of diversified ranking of pictures.

Figure 5:
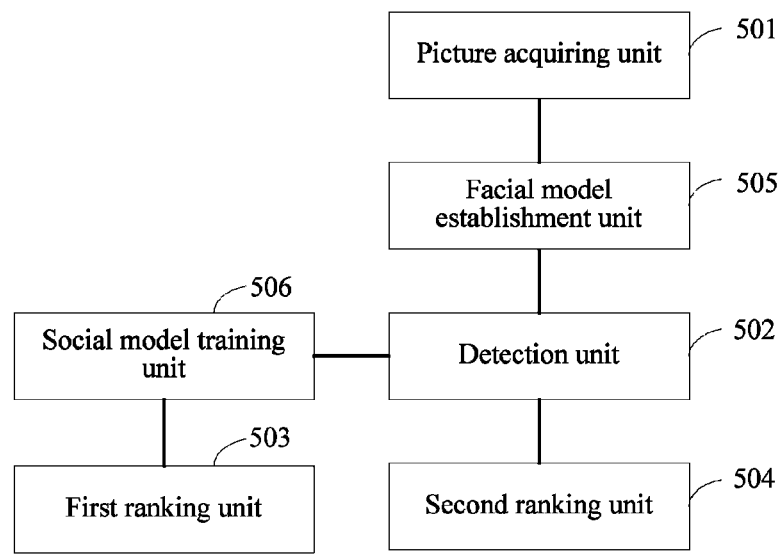
FIG. 5 is a first structural diagram of a terminal according to an embodiment of the present disclosure.

Based on a technical concept that is the same as that of the foregoing method, an embodiment of this application further provides a terminal. As shown in FIG. 5, the terminal includes a picture acquiring unit 501 configured to acquire pictures stored in the terminal, a detection unit 502 configured to receive the pictures sent by the picture acquiring unit, and detect whether the pictures are first-type pictures, where the first-type picture refers to a picture including a human face, a first ranking unit 503 configured to, when the detection unit detects that the pictures are first-type pictures, rank the pictures according to a social relation model, and a second ranking unit 504 configured to, when the detection unit detects that the pictures are not first-type pictures, rank the pictures according to a preset rule.

The terminal in this embodiment of this application is, for example, a mobile phone, a tablet computer, or another terminal. The pictures may be captured using a camera disposed in the terminal or an external camera, and then stored in the terminal, or may be downloaded from a local database or an external database and stored. Then, the picture acquiring unit 501 acquires the pictures stored in the terminal.

In one embodiment, the terminal further includes a facial model establishment unit 505, where the facial model establishment unit 505 is configured to extract a feature value of a stored human face image, and learn the feature value of the human face image using a machine learning method, and establish a facial recognition model. The detection unit 502 is configured to detect whether the pictures are first-type pictures according to the facial recognition model established by the facial model establishment unit 505.

In one embodiment, the facial model establishment unit 505 is configured to, when the feature value of the stored human face image is to be extracted, extract the feature value of the stored human face image using a knowledge-based representation method and an algebraic feature based representation method or a statistical learning based representation method. The knowledge-based representation method mainly obtains, according to shape descriptions of organs of human faces and features of distances between the organs, feature data facilitating classification of human faces, and a feature component of the feature data generally includes a Euclidean distance, curvature, and an angle between feature points. The human face mainly includes parts such as eyes, a nose, a mouth, and a chin, and the knowledge-based human face representation mainly acquires geometric features of these parts and of structural relations between these parts. Then, the facial recognition model is established and updated using the machine learning method.

In one embodiment, the detection unit 502 is configured to extract feature values of the pictures, perform matching between the feature values of the pictures and the facial recognition model, and when a result of the matching is higher than a first preset value, determine that the pictures are the first-type pictures, or when a result of the matching is not higher than a first preset value, determine that the pictures are not the first-type pictures.

In one embodiment, the first preset value is, for example, a value greater than or equal to 50%, and may be, for example, 50%, 60%, 70%, or another value. After extracting the feature values of the pictures, the detection unit 502 is configured to perform matching between the feature values of the pictures and the facial recognition model, and if the result of the matching is higher than the first preset value, determine that the pictures are the first-type pictures, or if the result of the matching is not higher than the first preset value, determine that the pictures are not the first-type pictures.

In one embodiment, the terminal further includes a social model training unit 506.

The social model training unit 506 is configured to train the social relation model using a stored profile picture of a contact and information about the contact.

The first ranking unit 503 is configured to, when the detection unit detects that the pictures are first-type pictures, rank the pictures according to the social relation model trained by the social model training unit 506.

In one embodiment, when the social model training unit 506 is to train the social relation model, the social model training unit 506 collects, for each contact, statistics about information, such as a quantity of contact times, a time point of contact, content of a short message service message of each contact, and obtains a relation between the contact and a user operating the terminal in a training prediction manner. For example, for each contact, an identity of the contact is deduced according to examples or rules of calls or short message service messages that are within a particular time period, and as interaction gradually increases, the relation between the contact and the user is automatically determined. In this manner, dependency between the user and each contact may be obtained. For example, the contact is a friend, a relative, a customer, or the like. Then the social relation is established according to the dependency between the user and each contact, where the social relation is used to represent a structural expression manner of a social relation between the user and other contacts. The user and other contacts in the social relation are all represented using nodes, and a connection line between the user and each contact of other contacts is used to represent the dependency between the two, for example, a relation such as a friend, a relative, or a customer.

In one embodiment, the social model training unit 506 is configured to extract profile picture data of the contact, and annotate the profile picture data using the information about the contact to obtain the social relation model.

In one embodiment, the first ranking unit 503 is configured to acquire, using the social relation model, information about contacts corresponding to the pictures, where the information about the contacts corresponding to the pictures includes identity features of the contacts, and when the information about the contacts corresponding to the pictures is successfully acquired, add the pictures to a recognized face group, and rank pictures in the recognized face group according to the identity features, or when the information about the contacts corresponding to the pictures is not acquired, add the pictures to an unrecognized face group, and perform clustering ranking on images in the unrecognized face group according to the preset rule.

Because the social relation model is to extract the profile picture data of the contact, and annotate the profile picture data using the information about the contact to obtain the social relation model, in this way, the information about the contacts corresponding to the pictures may be acquired using the social relation model, where the information about the contacts corresponding to the pictures includes the identity features of the contacts, and the identity feature is a relation between the contact corresponding to the picture and the user operating the terminal.

In one embodiment, when the identity features are obtained using the social relation model, ranking is performed according to the closeness between the contacts and the user operating the terminal. When the information about the contacts corresponding to the pictures is not acquired, ranking is performed in a clustering grouping manner according to similarities of human face pictures.

When ranking is performed according to the closeness between the contacts and the user, a contact with a closer relation is ranked higher, and a contact with a more distant relation is ranked lower. After the identity features of the contacts corresponding to the pictures are acquired, profile picture data of the contacts corresponding to the pictures is extracted, the profile picture data is annotated using the information about the contacts to obtain the social relation model, the facial recognition model is trained using the pictures, and the social relation model is trained using the pictures.

Because the pictures may be the first-type pictures, or may be the second-type pictures, pictures stored in the terminal may be classified into two types, where a first type is the first-type pictures, and a second type is pictures that are not the first-type pictures. Further, in the first-type pictures, all pictures for which the identity features of the contacts of the pictures are acquired may further be classified as the recognized face group, and all pictures for which the identity features of the contacts of the pictures are not acquired are classified as the unrecognized face group, so that when a picture is searched for, searching may be performed according to a group or type to which the picture belongs, and a quantity of pictures that are searched becomes smaller, thereby improving work efficiency of picture searching. Moreover, when the recognized face group is searched for a picture, because all pictures in the recognized face group are annotated using information about contacts corresponding to the pictures, in this way, the picture may be searched for in a contact information index search manner, which further improves the work efficiency of the picture searching.

In another embodiment, the facial recognition model may further update an old model according to newly learned knowledge, so that each model is continuously updated and optimized. For example, for establishment and updating of a human face classification model, all types are harmonized, facial recognition of each contact is used as an independent task, and a global learning model and a customized task configuration are introduced to different tasks. Therefore, for a human face that is not seen before, the new human face may be expressed by invoking a global feature that is learned from features of seen human faces, so that expression of the new human face is discriminative, and as samples gradually increase, the facial recognition model is continuously updated, performance of discriminating the human face becomes better, and the pictures can be recognized more accurately using the recognition model.

In this embodiment of the present disclosure, in the technical solution of this application, it is detected whether acquired pictures are first-type pictures, and when the pictures are first-type pictures, the pictures are ranked according to a social relation model, or when the pictures are not first-type pictures, the pictures are ranked according to a preset rule. In this way, the pictures may be ranked in different manners according to different types of the pictures, thereby resolving a technical problem in the prior art that ranking of pictures is monotonous, and achieving a technical effect of diversified ranking of pictures.

Figure 6:
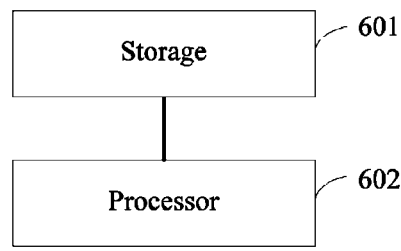
FIG. 6 is a second structural diagram of a terminal according to an embodiment of the present disclosure.

Based on a technical concept that is the same as that of the foregoing method, an embodiment of this application further provides a terminal. As shown in FIG. 6, the terminal includes, a storage 601 configured to store pictures, and a processor 602 configured to acquire the pictures stored in the storage 601, detect whether the pictures are first-type pictures, where the first-type picture refers to a picture including a human face, and when the pictures are first-type pictures, rank the pictures according to a social relation model, or when the pictures are not first-type pictures, rank the pictures according to a preset rule.

The storage 601 is, for example, an electronic device such as a memory or a hard disk of the terminal. Further, the processor 602 is, for example, an independent processing chip, or may be a processing chip of the terminal.

In one embodiment, the processor 602 is further configured to, before detecting whether the pictures are first-type pictures, extract a feature value of a stored human face image, and learn the feature value of the human face image using a machine learning method, establish a facial recognition model, and detect, using the established facial recognition model, whether the pictures are the first-type pictures.

In one embodiment, the processor 602 is configured to, when the feature value of the stored human face image is to be extracted, extract the feature value of the stored human face image using a knowledge-based representation method and an algebraic feature based representation method or a statistical learning based representation method. The knowledge-based representation method mainly obtains, according to shape descriptions of organs of human faces and features of distances between the organs, feature data facilitating classification of human faces, and a feature component of the feature data generally includes a Euclidean distance, curvature, and an angle between feature points. The human face mainly includes parts such as eyes, a nose, a mouth, and a chin, and the knowledge-based human face representation mainly acquires geometric features of these parts and of structural relations between these parts. Then, the facial recognition model is established and updated using the machine learning method.

In one embodiment, the processor 602 is further configured to extract feature values of the pictures, perform matching between the feature values of the pictures and the facial recognition model, and when a result of the matching is higher than a first preset value, determine that the pictures are the first-type pictures, or when a result of the matching is not higher than a first preset value, determine that the pictures are not the first-type pictures.

In one embodiment, the first preset value is, for example, a value greater than or equal to 50%, and may be, for example, 50%, 60%, 70%, or another value. After extracting the feature values of the pictures, the processor 602 is configured to perform matching between the feature values of the pictures and the facial recognition model, and if the result of the matching is higher than the first preset value, determine that the pictures are the first-type pictures, or if the result of the matching is not higher than the first preset value, determine that the pictures are not the first-type pictures.

In one embodiment, the storage 601 is configured to store a profile picture of a contact and information about the contact. The processor 602 is further configured to, before ranking the pictures according to the social relation model, train the social relation model using the profile picture of the contact and the information about the contact, and rank the pictures according to the trained social relation model.

In one embodiment, the processor 602 is configured to, when the processor 602 is to train the social relation model, collect, for each contact, statistics about information, such as a quantity of contact times, a time point of contact, content of a short message service message of each contact, and obtain a relation between the contact and a user operating the terminal in a training prediction manner. For example, for each contact, an identity of the contact is deduced according to examples or rules of calls or short message service messages that are within a particular time period, and as interaction gradually increases, the relation between the contact and the user is automatically determined. In this manner, dependency between the user and each contact may be obtained. For example, the contact is a friend, a relative, a customer, or the like. Then the social relation is established according to the dependency between the user and each contact, where the social relation is used to represent a structural expression manner of a social relation between the user and other contacts. The user and other contacts in the social relation are all represented using nodes, and a connection line between the user and each contact of other contacts is used to represent the dependency between the two, for example, a relation such as a friend, a relative, or a customer.

In one embodiment, the processor 602 is further configured to extract profile picture data of the contact, and annotate the profile picture data using the information about the contact to obtain the social relation model.

In one embodiment, the processor 602 is further configured to acquire, using the social relation model, information about contacts corresponding to the pictures, where the information about the contacts corresponding to the pictures includes identity features of the contacts, and when the information about the contacts corresponding to the pictures is successfully acquired, add the pictures to a recognized face group, and rank pictures in the recognized face group according to the identity features, or when the information about the contacts corresponding to the pictures is not acquired, add the pictures to an unrecognized face group, and perform clustering ranking on images in the unrecognized face group according to the preset rule.

Because the social relation model is to extract the profile picture data of the contact, and annotate the profile picture data using the information about the contact to obtain the social relation model, in this way, the information about the contacts corresponding to the pictures may be acquired using the social relation model, where the information about the contacts corresponding to the pictures includes the identity features of the contacts, and the identity feature is a relation between the contact corresponding to the picture and the user operating the terminal.

In one embodiment, when the identity features are obtained using the social relation model, ranking is performed according to the closeness between the contacts and the user operating the terminal. When the information about the contacts corresponding to the pictures is not acquired, ranking is performed in a clustering grouping manner according to similarities of human face pictures.

When ranking is performed according to the closeness between the contacts and the user, a contact with a closer relation is ranked higher, and a contact with a more distant relation is ranked lower. After the identity features of the contacts corresponding to the pictures are acquired, profile picture data of the contacts corresponding to the pictures is extracted, the profile picture data is annotated using the information about the contacts to obtain the social relation model, the facial recognition model is trained using the pictures, and the social relation model is trained using the pictures.

Because the pictures may be the first-type pictures, or may be the second-type pictures, pictures stored in the terminal may be classified into two types, where a first type is the first-type pictures, and a second type is pictures that are not the first-type pictures. Further, in the first-type pictures, all pictures for which the identity features of the contacts of the pictures are acquired may further be classified as the recognized face group, and all pictures for which the identity features of the contacts of the pictures are not acquired are classified as the unrecognized face group, so that when a picture is searched for, searching may be performed according to a group or type to which the picture belongs, and a quantity of pictures that are searched becomes smaller, thereby improving work efficiency of picture searching. Moreover, when the recognized face group is searched for a picture, because all pictures in the recognized face group are annotated using information about contacts corresponding to the pictures, in this way, the picture may be searched for in a contact information index search manner, which further improves the work efficiency of the picture searching.

In another embodiment, the facial recognition model may further update an old model according to newly learned knowledge, so that each model is continuously updated and optimized. For example, for establishment and updating of a human face classification model, all types are harmonized, facial recognition of each contact is used as an independent task, and a global learning model and a customized task configuration are introduced to different tasks. Therefore, for a human face that is not seen before, the new human face may be expressed by invoking a global feature that is learned from features of seen human faces, so that expression of the new human face is discriminative, and as samples gradually increase, the facial recognition model is continuously updated, performance of discriminating the human face becomes better, and the pictures can be recognized more accurately using the recognition model.

In the embodiments of the present disclosure, in the technical solutions of this application, it is detected whether acquired pictures are first-type pictures, and when the pictures are first-type pictures, the pictures are ranked according to a social relation model, or when the pictures are not first-type pictures, the pictures are ranked according to a preset rule. In this way, the pictures may be ranked in different manners according to different types of the pictures, thereby resolving a technical problem in the prior art that ranking of pictures is monotonous, and achieving a technical effect of diversified ranking of pictures.

Persons skilled in the art should understand that the embodiments of the present disclosure may be provided as a method, a terminal, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a Compact Disc Read-Only Memory (CD-ROM), an optical memory, and the like) that include computer-usable program code.

The present disclosure is described with reference to the flowcharts and/or block diagrams of the method, the terminal, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable processing device to generate a machine, so that the instructions executed by a computer or a processor of any other programmable processing device generate a terminal for implementing a specific function in one or more processes in the flowcharts and/or in one or more blocks in the block diagrams.

These computer program instructions may be stored in a computer readable memory that can instruct the computer or any other programmable processing device to work in a specific manner, so that the instructions stored in the computer readable memory generate an artifact that includes an instruction terminal. The instruction terminal implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A picture ranking method, comprising:
   acquiring, by a processor in a terminal, stored pictures from a memory in the terminal;
   detecting, from the stored pictures, first-type pictures, second-type pictures, or both the first-type pictures and the second-type pictures, wherein the first-type pictures refer to pictures that comprise at least one human face, and wherein the second-type pictures refer to pictures that do not comprise a human face;
   ranking the first pictures according to identity features of the first contacts when the first-type pictures are detected and information about first contacts corresponding to at least some first pictures of the first-type pictures is acquired, wherein the identity features are acquired using a social relation model, wherein the identity features indicate social relation categories selected for the first contacts, and wherein the social relation categories selected for the first contacts identify different types of social relations between the first contacts and a user of the terminal; and
   ranking the second-type pictures according to a first preset rule when the second-type pictures are detected.

2. The method according to claim 1, wherein, when the first-type pictures are detected and information about second contacts corresponding to at least some second pictures of the first-type pictures is not acquired, the method further comprises:
   cluster grouping the second pictures to generate one or more cluster groups of the second pictures based on similarities of human faces in the second pictures; and
   ranking the cluster groups according to a second preset rule that is different than the first preset rule.

3. The method according to claim 1, wherein the first preset rule includes time points or locations associated with the second-type pictures.

4. The method according to claim 1, wherein before ranking the first pictures according to the identity features, the method further comprises:
   acquiring interaction statistics between each of the first contacts and the user;
   selecting, based on the interaction statistics, the social relation categories for the first contacts from a plurality of categories that includes a friend category, a relative category, a classmate category, and a customer category; and
   training the social relation model using stored profile pictures of the first contacts and the social relation categories selected for the first contacts.

5. The method according to claim 4, wherein training the social relation model using the stored profile pictures of the first contacts and the social relation categories selected for the first contacts comprises:
   extracting profile picture data of the first contacts; and
   annotating the profile picture data using the social relation categories selected for the first contacts to obtain the social relation model.

6. The method according to claim 1, wherein ranking the first pictures according to the identity features further comprises:
   acquiring, using the social relation model, information about the first contacts corresponding to the first pictures, wherein the information about the first contacts corresponding to the first pictures comprises the identity features selected for the first contacts;
adding the first pictures to a recognized face group when the information about the first contacts corresponding to the first pictures is successfully acquired; and
ranking the first pictures in the recognized face group according to the identity features.

7. The method according to claim 2, wherein ranking the cluster groups according to the second preset rule comprises:
adding the second pictures to an unrecognized face group; and
performing clustering ranking on the second pictures in the unrecognized face group according to the second preset rule.

8. The method according to claim 1, wherein before detecting the first-type pictures, the second-type pictures, or both the first-type pictures and the second-type pictures, the method further comprises:
extracting a feature value of a stored human face image;
learning the feature value of the stored human face image using a machine learning method; and
establishing a facial recognition model.

9. The picture ranking method according to claim 8, wherein detecting the first-type pictures comprises:
extracting feature values of the stored pictures;
performing a matching between the feature values of the stored pictures and the facial recognition model; and
determining that the first-type pictures are the first-type pictures when a result of the matching is higher than a first preset value.

10. The picture ranking method according to claim 8, wherein detecting the second-type pictures comprises:
extracting feature values of the stored pictures;
performing a matching between the feature values of the stored pictures and the facial recognition model; and
determining that the second-type pictures are not the first-type pictures when a result of the matching is not higher than a first preset value.

11. A terminal, comprising:
a memory configured to store stored pictures;
a processor coupled to the memory and configured to:
acquire the stored pictures from the memory;
detect, from the stored pictures, first-type pictures, second-type pictures, or both the first-type pictures and the second-type pictures, wherein the first-type pictures refer to pictures that comprise at least one human face, and wherein the second-type pictures refer to pictures that do not comprise a human face;
rank the first pictures according to identity features of the first contacts when the first-type pictures are detected and information about first contacts corresponding to at least some first pictures of the first-type pictures is acquired, wherein the identity features are acquired using a social relation model, wherein the identity features indicate social relation categories selected for the first contacts, and wherein the social relation categories selected for the first contacts identify different types of social relations between the first contacts and a user of the terminal; and
rank the second-type pictures according to a first preset rule when the second-type pictures are detected.

12. The terminal according to claim 11, wherein the processor is further configured to train the social relation model using stored profile pictures of the first contacts and the social relation categories selected for the first contacts.

13. The terminal according to claim 11, wherein the processor is further configured to:
extract profile picture data of the first contacts; and
annotate the profile picture data using the social relation categories selected for the first contacts to obtain the social relation model.

14. The terminal according to claim 11, wherein the processor is further configured to:
acquire, using the social relation model, information about the first contacts corresponding to the first pictures, wherein the information about the first contacts corresponding to the first pictures comprises the identity features of the first contacts;
add the first pictures to a recognized face group, and
rank the first pictures in the recognized face group according to the identity features when the information about the first contacts corresponding to the first pictures is successfully acquired.

15. The terminal according to claim 11, wherein, when the first-type pictures are detected and information about second contacts corresponding to at least some second pictures of the first-type pictures is not acquired, the processor is further configured to:
add the second pictures to an unrecognized face group; and
perform clustering ranking on the second pictures in the unrecognized face group according to a second preset rule that is different than the first preset rule.

16. The terminal according to claim 11, wherein the processor is further configured to:
extract a feature value of a stored human face image;
learn the feature value of the stored human face image using a machine learning method;
establish a facial recognition model; and
detect whether the stored pictures are the first-type pictures according to the facial recognition model.

17. The terminal according to claim 16, wherein the processor is further configured to:
extract feature values of the stored pictures;
perform a matching between the feature values of the stored pictures and the facial recognition model; and
determine that the first-type pictures are the first-type pictures when a result of the matching is higher than a first preset value.

18. The terminal according to claim 16, wherein the processor is further configured to:
extract feature values of the stored pictures;
perform a matching between the feature values of the stored pictures and the facial recognition model; and
determine that the second-type pictures are not the first-type pictures when a result of the matching is not higher than a first preset value.

19. The method according to claim 2, wherein ranking the cluster groups according to the second preset rule includes ranking the cluster groups based on a quantity of pictures in each of the cluster groups, wherein the social relation model includes nodes for the user and the first contacts, wherein the social relation model further comprises connection lines between the user and the first contacts, and wherein each of the connection lines is indicative of a social relation category selected for a contact of the first contacts corresponding to the connection line.

20. The method according to claim 4, wherein the interaction statistics for each of the first contacts includes a quantity of contact times between the contact and the user, a time point of one or more communications between the contact and the user, and content of one or more short message service messages between the contact and the user.

\* \* \* \* \*

UNITED STATES PATENT AND TRADEMARK OFFICE
CERTIFICATE OF CORRECTION

PATENT NO. : 9,977,951 B2
APPLICATION NO. : 15/255468
DATED : May 22, 2018
INVENTOR(S) : Zhuolin Jiang and Qiang Yang It is certified that error appears in the above-identified patent and that said Letters Patent is hereby corrected as shown below:

On the Title Page

Under item Notice should read:
Subject to any disclaimer, the term of this patent is extended or adjusted under 35 U.S.C. 154 (b) by 0 days.

Signed and Sealed this
Third Day of July, 2018

Andrei Iancu
*Director of the United States Patent and Trademark Office*